United States Patent [15] 3,703,611

Kiyomiya et al. [45] Nov. 21, 1972

[54] TELEPHONE SYSTEM

[72] Inventors: Hiromoto Kiyomiya; Yukio Fukumiya; Mithuzi Aoki, all of Yokohama; Hiromichi Mama, Kanagawa, all of Japan

[73] Assignees: Hitachi, Ltd., Tokyo; Hitachi Electronics Engineering Co. Ltd., Yokohama, Japan

[22] Filed: March 17, 1970

[21] Appl. No.: 20,243

[30] Foreign Application Priority Data

March 31, 1969 Japan ......................44/23812

[52] U.S. Cl. .................................179/99, 179/1 CN
[51] Int. Cl. .............................................H04m 1/00
[58] Field of Search...............179/99, 39, 17 B, 1 CN

[56] References Cited

UNITED STATES PATENTS

| | | | |
|---|---|---|---|
| 2,270,915 | 1/1942 | Abbott et al. | 179/1 CN |
| 3,470,322 | 9/1969 | Rice et al. | 179/1 CN |
| 3,420,963 | 1/1969 | Abbott | 179/99 |
| 3,436,488 | 4/1969 | Barbato et al. | 179/99 |
| 2,181,715 | 11/1939 | Waite | 179/39 |
| 2,741,667 | 4/1956 | Schneider et al. | 179/39 |
| 3,239,610 | 3/1966 | Morse et al. | 179/99 UX |

*Primary Examiner*—Kathleen H. Claffy
*Assistant Examiner*—Horst F. Brauner
*Attorney*—Craig and Antonelli

[57] ABSTRACT

A telephone system having a main unit including a talking path over an office line, a talking path over an extension line, an extension ringing circuit and a control circuit, and a plurality of key telephone sets connected in parallel with the main unit and each having a talking circuit, a call indicating circuit and a control circuit. Each key telephone set is provided with a first non-locking key disposed on the control circuit thereof, a relay which is energized and holds itself via the control circuit of the main unit in response to the actuation of the first non-locking key, and a second non-locking key for releasing the relay via the control circuit of the main unit so that the talking circuit of each key telephone set is connectable with the office line and the extension line through the contacts of the relay.

10 Claims, 1 Drawing Figure

PATENTED NOV 21 1972 3,703,611
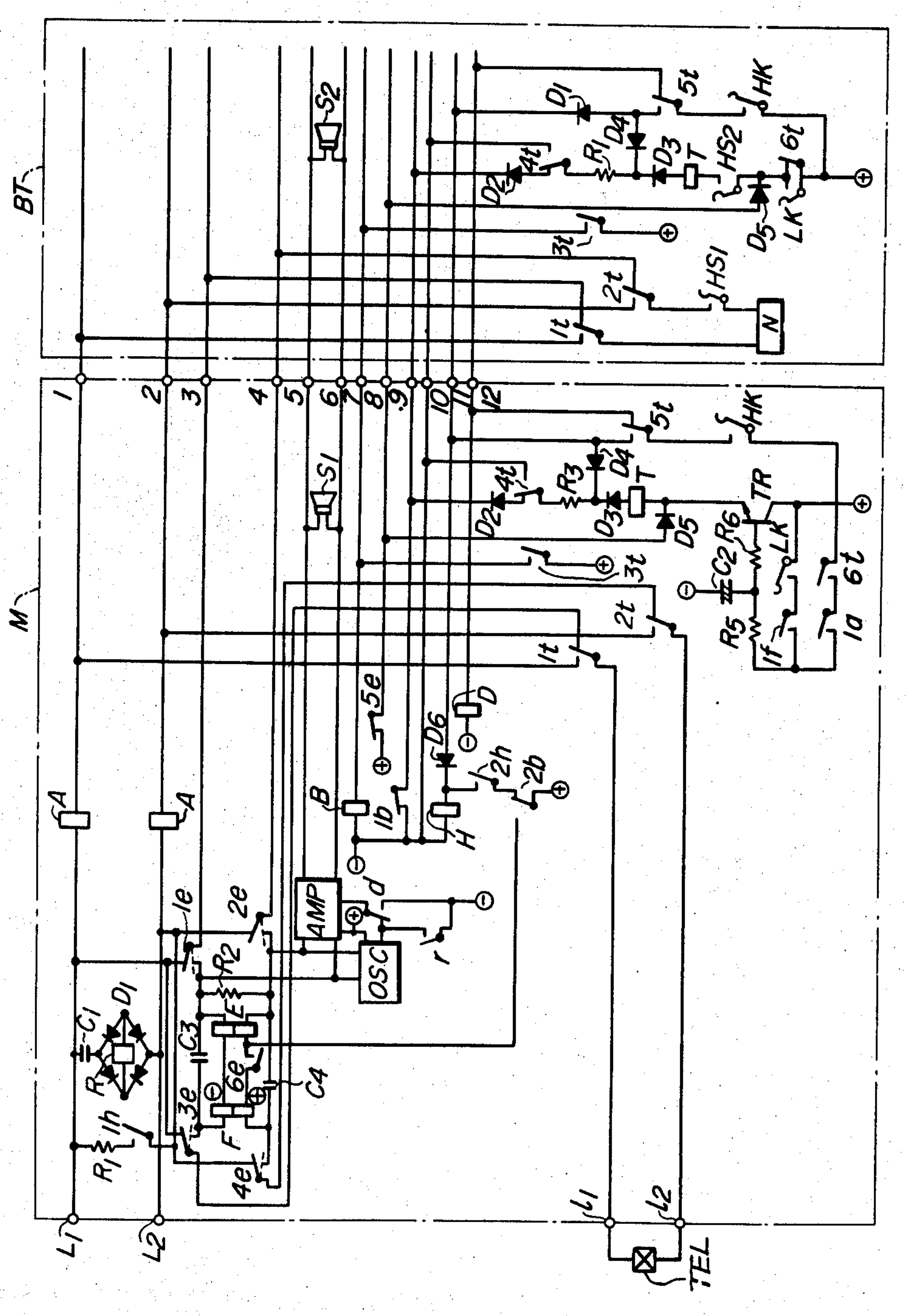
INVENTORS
HIROMOTO KIYOMIYA, YUKIO FUKUMIYA,
MITHUZI AOKI and HIROMICHI MAMA
BY Craig, Antonelli, Stewart & Hill
ATTORNEYS

TELEPHONE SYSTEM

BACKGROUND OF THE INVENTION

1. Field of the Invention

This invention relates to a key telephone system in which a plurality of telephone sets are connected in parallel with the same circuit so that a call can be originated from, terminated in, answered by, held at and transferred from anyone of the telephone sets, and at the same time, a call from one of the telephone sets to another and conversations between the telephone sets can be freely effected.

2. Summary of the Invention

It is a primary object of the present invention to provide a novel and inexpensive key telephone system which utilizes a subscriber's telephone station provided in the common home in its existing state without applying any modification or reconstruction thereto.

Another object of the present invention is to simplify the operation including the switching between the office line and extension lines and holding and origination of a call thereby improving the operating efficiency of the key telephone system.

Various limitations and problems pertinent to the circuit system are encountered in carrying out these improvements on a key telephone system. For example, the attainment of the first object is encountered with a difficulty of obtaining talk supervising information from the existing telephone set to the additional equipment. While the second object can be attained by employing an easily depressible small-sized non-locking key to energize a relay and electively holding the relay in the energized state to establish a circuit, some measures must be taken to deal with possible interruption of the power supply for the momentary cut-off means for the office line. The present invention contemplates the provision of a novel key telephone system which overcomes these problems.

BRIEF DESCRIPTION OF THE DRAWING:

The sole FIGURE is a circuit diagram of an embodiment of the present invention.

DESCRIPTION OF THE PREFERRED EMBODIMENT:

Referring to the drawing, a standard telephone set TEL as used in the common home is connected to a main unit M, and a plurality of key telephone sets BT provided with keys are connected in parallel with the main unit M. For convenience of explanation, the combination of the main unit M and the telephone set TEL will hereinafter be referred to as a main station. The main unit M includes terminals $L_1$ and $L_2$ connected to the office line, terminals $l_1$ and $l_2$ connected to the telephone set TEL, relays A, B, D, E, F, H and T having respective contacts 1*a*, 2*a*, 1*b*, and so on, an amplifier AMP, an oscillator OSC, a speaker $S_1$, and D.C. voltage supply terminals ⊕ and ⊖ to which a D.C. voltage is supplied by converting an A.C. voltage supplied from a commercial power supply. The main unit M further includes a main switch LK of the non-locking type, a holding and calling switch HK of the non-locking type, a bridge rectifier $D_1$, diodes $D_2$, $D_3$ , $D_4$, $D_5$ and $D_6$, resistors $R_1$, $R_2$ and $R_3$, capacitors $C_1$, $C_2$, $C_3$ and $C_4$, and a transistor TR.

Each key telephone set BT includes a talking circuit N, a main switch LK of the non-locking type, a holding and calling switch HK of the non-locking type, a speaker $S_2$, a relay T having contacts 1*t*, 2*t*, 3*t*, 4*t*, 5*t* and 6*t*, hook switches $HS_1$ and $HS_2$ operating in response to the raising and hanging up of the handset, a resistor $R_1$, and diodes $D_1$, $D_2$, $D_3$, $D_4$ and $D_5$.

The busy indication circuit and any other circuits which are not directly related with the present invention are not shown in the drawing. In the state in which power is supplied to the main unit M, the relay E is continuously energized through the resistor $R_2$ so that its contacts 1e, 2e, 3e and 4e are urged to the position shown by the dotted line. The circuits of the key telephone set BT terminate in terminals 1 through 10 of the main unit M. The terminals 1 and 2 are provided for the office line circuit, the terminals 3 and 4 for the extension circuit, the terminals 5 and 6 for the speaker or audio circuit, and the terminals 7 through 12 for the power supply and control circuits.

In operation, when a call arrives at the main unit M by way of the office line, the ringing signal appears and the relay R is energized by the circuit consisting of the office line terminal $L_1$ — capacitor $C_1$ — rectifier $D_1$ — relay R — office line terminal $L_2$. Due to the energization of the relay R, its contact r is urged to the closed position so that power is supplied to the oscillator OSC and amplifier AMP. Upon application of the power to the oscillator OSC, the oscillator OSC generates a signal which includes modulation of about 600 Hz by about 16 Hz, and the signal is amplified by the amplifier AMP and is supplied to the speakers $S_1$ and $S_2$ which are connected to the audio circuit so as to give an audible indication of the receipt of a call from the office line. An answer to the call can be effected by raising the handset of the main station or one of the key telephone sets BT and depressing the main switch LK.

Suppose now that the call is answered by raising the handset of the main station. Raising of the handset of the telephone set TEL results in the energization of the relay F, and in response to subsequent depression of the main switch LK, the transistor TR is operated to energize the relay T. The energization of the relay T results in the switch-over of the position of its contacts 1*t* and 2*t*, and the telephone set TEL is now connected to the office line circuit from its previous connection with the extension circuit. This is followed by the release of the relay F and energization of the relay A. Further, due to the switch-over of the position of the contact 3*t* of the relay T, the relay B is energized. The main switch LK is of the non-locking type and therefore it is restored to its original position upon detachment of the finger from the switch LK. Since, however, the relay A has already been energized, the transistor TR is kept biased by the circuit including the contacts 1a and 6*t*, and the relay T holds itself by the circuit which is traced from ⊕ — transistor TR — relay T — diode $D_3$ — resistor $R_3$ — contact 4t — ⊖.

When the handset of the telephone set TEL is hung up at the completion of the call, the relay A is released and the contact 1a of the relay A is urged to its open position with the result that the transistor TR is cut off to release the relay T. This is followed by the release of the relay B and the original conditions are restored.

The holding and calling key HK may be depressed when it is desired to transfer the call to the key telephone set BT from the telephone set TEL. The relay H is energized by the circuit which is traced from⊕ — holding and calling switch HK — contact 5$t$ — diode $D_6$ — relay H —⊖, and at the same time, the ground potential ⊕ is supplied to the negative side of the relay T, which is therefore released. The release of the relay T is followed by the release of the relay B, while the relay H holds itself by the circuit which is traced from⊕ — contact 2$b$ — contact 2$h$ — relay H — ⊖ so as to continuously hold the circuit including the office line terminal $L_1$ — resistor $R_1$ — contact 1$h$ — office line terminal $L_2$ in the closed position until an answer to the call is received.

The telephone set TEL is connected again with the extension circuit by the release of the relay T, and further depression of the holding and calling switch HK causes energization of the relay D by the circuit which is traced from ⊕ — holding and calling key HK — contact 5$t$ — relay D —⊖. The relay D is continuously kept in the energized state so long as the holding and calling key HK is kept depressed. The amplifier AMP is placed in operation by the power supplied thereto through the contact d of the energized relay D. Thus, when a call is carried out by the handset while depressing the holding and calling key HK, the voice output delivered from the telephone set TEL is supplied through the extension circuit to the amplifier AMP and is amplified thereby and is broadcast from the speaker $S_2$ of the key telephone set BT. Although not illustrated in the drawing, an arrangement is made so that the speaker in the main station is cut-off from the circuit by the holding and calling switch while the speaker in the key telephone set BT is cut off from the circuit by the hook switches so as to prevent howling during speaker output.

At the key telephone set BT to which the call is transferred, the handset is raised and the main switch LK is depressed. In response to the depression of the main switch LK, the relay T in the answering key telephone set BT and the relay B in the main unit M are again energized resulting in the release of the relay H so that the call over the office line can be effected. A call from one of the key telephone sets BT to another for a call therebetween or a call from one of the key telephone sets BT to the main station for a call therebetween is also possible independently of the holding and transfer of the call. In this case, the handset is raised and a call is made while depressing the holding and calling key HK. The operation in this case is the same as the operation carried out during the holding of the call arriving from the office line described above except that the relay H is not energized and the relays T and B are unreleased.

While the above description has chiefly referred to the general operation of the main station, the operation in the case of the key telephone set BT is the same as above except for two points described below. In the first place, the relays A and F are used for the supervision of the call via the telephone set TEL. This function of the relays A and F is analogous to the function of the hook switch $HS_2$ in the key telephone set BT and is a means for utilizing the telephone set TEL in its existing form without any modifications. In the second place, the slow releasing circuit including the transistor TR, capacitor $C_2$ and resistors $R_4$ and $R_6$ is provided in order not to release the talking circuit including the relay T even when the talk supervisory relay A might be momentarily released depending on the connecting conditions of the switching frame at the time of the origination of a call.

In a system in which a talking circuit is electrically held in the connected state and a commercial power source supplies the necessary power, consideration must be taken so that a call over the office line can be continued even if the power supplied thereto should be cut off due to interruption of the power supply during the call over the office line. This is realized in the present invention by utilizing the release of the relay E which is kept energized so long as the power is supplied to the main unit M. When the power supply is interrupted during a call, the talking circuit between the office line and the key telephone set BT is automatically switched over to the extension talking path which is traced from the office line terminal $L_1$ — contact 1$e$ (solid line) — contact 1$t$ — talking circuit N — hook switch $HS_1$ — contact 2$t$ — contact 2$e$ (solid line) — office line terminal $L_2$. Although the oscillator OSC and amplifier AMP case to function in the case of the interruption of the power supply, a call arriving from the office line can be indicated by the ringing of the telephone bell set TEL and can thus be answered.

Further, during the interruption of the power supply, the telephone set TEL and key telephone set BT serve as branch telephones and a call over the office line can be carried out by merely raising the handset. When the power supply is restored during the call on the talking path between the key telephone set BT and the office line, the relay T is energized by the circuit which is traced from ⊕ — contact 5$e$ — diode $D_5$ — hook switch $ES_2$ — relay T — diode $D_3$ — resistor $R_1$ — contact 4$t$ — diode $D_2$ — contact 1$b$ —⊖. The relay B is then energized to energize the relay E in turn by the contact 2$b$ so that the relay E holds itself by the circuit including its contact 6$e$ and the resistor $R_2$ and thus the state existing before the interruption of the power supply is restored.

The system according to the present invention is provided with a privacy protective function. The system embodying the present invention is so arranged that, during a call between the office line and anyone of the telephone set TEL and key telephone sets BT, another person cannot break into the call. The privacy of the talk can be protected by restraining the relays T from being energized. More precisely, the relays T must be energized in order that the telephone set TEL and key telephone sets BT can be connected with the office line. The relays T are connected to the negative terminal of the power supply through the contact 1$b$ of the relay B, and during the call with anyone of these telephone sets via the office line, the contact 1$b$ is urged to its open position due to the energization of the relay B. Thus, it is impossible to energize the relay T even if another person would like to break into the talk over the office line.

As will be apparent from the foregoing description, the present invention has the following advantages: In the first place, the telephone set TEL belonging to the main unit M may be an existing standard telephone set and no modification or reconstruction is necessary. In the second place, switches required for operation are not of the complex interlocking type having a large number of contacts, but are of the non-locking type having a small number of contacts, and relays are utilized as auxiliary contacts of the switches. Thus, the size of the key telephone sets can be reduced. Further, the provision of the combined holding and calling switch lends itself to the efficient operation of the system. Thirdly, the provision of the slow releasing circuit including the transistor TR to deal with momentary interruption of the connection with the office line is useful for preventing the release of the talking circuit which is electrically held in the connected state. Fourthly, the talking path is automatically switched over from the office line circuit to the extension circuit so as to thereby prevent the interruption of the call even when the power supply for the system might be cut off during the call over the office line.

We claim:

1. A telephone system comprising:
- means for connecting an office line with a standard telephone set;
- means, connected to said office line, for connecting a plurality of key telephone sets to said office line;
- an audio circuit connectable to said standard and key telephone sets;
- a power supply source and control circuit connected to said telephone sets, for controlling the interconnection thereof, said system being characterized by
- a main unit provided with
- a first non-locking key for switching said standard telephone sets to said office line and to an extension line,
- a second non-locking key for holding a line connected to said audio circuit for calling said standard telephone set, and
  - an oscillator and an amplifier circuit, connected to said audio circuit, for indicating the reception of a call and for amplifying audio signals, respectively; and
  - a plurality of key telephone sets, each of which is provided with
  - a first non-locking key for switching a talking circuit within the key telephone set to said office line and said extension line through said main unit control circuit, and
  - a second non-locking key for connecting the talking circuit within the key telephone set to said audio circuit through said amplifier circuit and for holding said locking circuit.

2. A telephone system according to claim 1, further including a standard telephone set connected to said main unit, and a power supply for said main unit, and wherein said main unit further includes a slow releasing circuit including a transistor which operates in such a manner that the talking path electrically established by the current appearing in said office line for connected said standard telephone set to said office line may be kept in the connected state despite any momentary interruption of the current in said office line.

3. A telephone system according to claim 1, further including a standard telephone set connected to said main unit, said first non-locking keys energizing a plurality of associated relays thereby selectively connecting said standard telephone set and each of said talking circuits to said office line, said second non-locking keys being operative so that snap action thereof during a conversation over said office line may hold said office line and actuate said amplifier included in said main unit connected to speakers in said telephone sets for providing an audio output.

4. A telephone system according to claim 1, further including a standard telephone set connected to said main unit and a power supply for said main unit and further comprising relays for supervising a conversation by way of said standard telephone set which is connected to said main unit by a pair of talking wires.

5. A telephone system according to claim 1, further including means, responsive to the transmission of a conversation between one of said telephone sets and said office line, for maintaining the relay in that telephone set in the energized state and an additional relay contained in said main unit in an energizing state, said additional relay including at least one contact connectable with each of said telephone sets for preventing any of the remaining telephone sets from breaking into the transmission between said one of said telephone sets and said office line.

6. A telephone system comprising:
- a main unit including a pair of office line connections for providing a talking path to an office line, a pair of extension line connections for providing a talking path to an extension line, and a pair of auxiliary terminals for connecting said unit to a first telephone set;
- a ringing relay and an audio circuit coupled to said office line connections for detecting and providing an indication of a termination of a call from an office line and for providing broadcast and ringing signals for connections;
- a first relay switchably connected to said auxiliary terminals for detecting the lifting up of the handset of said first telephone set;
- a switching circuit, including a contact of said first relay and a first non-locking key, responsive to the depression of said first non-locking key and the energization of said first relay, for connecting said telephone set to said pair of office line connections;
- a second relay coupled to said pair of office line connections for holding said switching circuit closed upon the release of said first relay after the connection of said first telephone set to said office line connections;
- said switching circuit including a transistor switch and a switching circuit relay connected in series, so that upon the triggering of said transistor, said switching circuit relay is energized to thereupon connect said telephone set through first and second contacts thereof to said pair of office line connections respectively, and wherein said transistor switching circuit further includes a triggering connection including said first non-locking key and a contact of said second relay, for deenergizing said transistor circuit and thereby said switching relay upon the deactivation of said first non-locking key and the hanging up of the hand set of said telephone set.

7. A telephone system according to claim 6, further including at least one key telephone set connected in parallel with said main unit and wherein said main unit further includes a holding and calling relay for transferring a call from said first telephone set to a key telephone set including a relay coil and a holding key therefor, coupled in series between a source of power for said relays and a contact of said switching circuit relay and including a circuit for effecting the deenergization of said switching circuit relay and a self-holding circuit for said holding relay, so as to continuously provide a communication path across said pair of office line connections until an answer to the call to be transferred is received.

8. A telephone system according to claim 7, further including a third relay connected to the series connection of said holding key and a contact of said switching circuit relay, for effecting the energization of said audio circuit during the closure of said holding key.

9. A telephone system according to claim 8, wherein each key telephone set comprises a main switching circuit including a main switch and a main switching circuit relay connected in series and wherein said main unit further comprises a fourth relay, having a contact disposed in said self-holding circuit of said holding and calling relay and wherein said switching circuit relay in said main unit and said main circuit relay in said key telephone set include contacts for energizing said fourth relay to prevent the energization of said holding and calling relay upon the energization of the relay coils in any one of said switching circuit relays, while permitting the energization of said holding relay during the deenergization of said fourth relay, whereby a call from said first telephone set through said main unit to a key telephone set may be transferred.

10. A telephone system according to claim 9, wherein each key telephone set further includes a first hook switch for connecting the main switching circuit relay and main switch in the main switching unit thereof and further including a talking circuit and a second hook switch coupled through respective contacts of said main switching circuit relay for enabling the connection of said key telephone set with said office line connections or said extension line connections in spite of a failure in the power supply for said main unit, and wherein said main unit further includes a control relay switchably connecting said audio circuit to said one of said pairs of office and extension lines.

* * * * *